May 7, 1929.  W. D. DRUMMOND  1,711,490
SAW GUARD
Filed Sept. 12, 1927  4 Sheets-Sheet 1
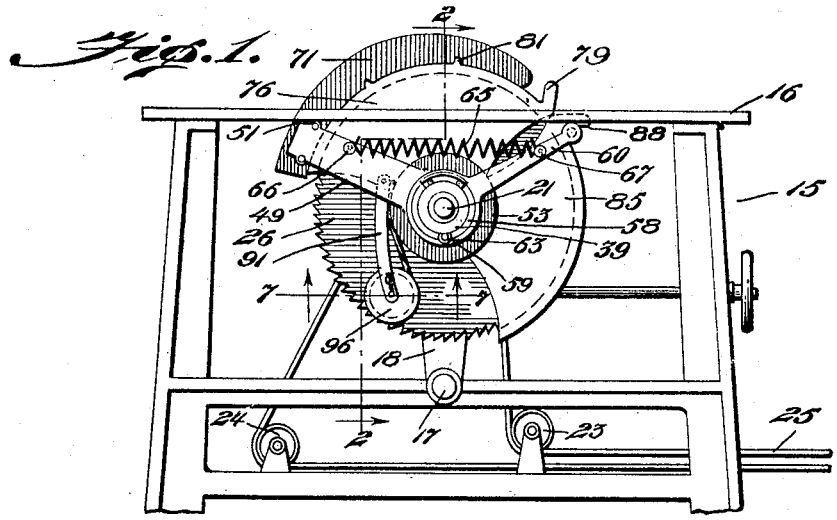
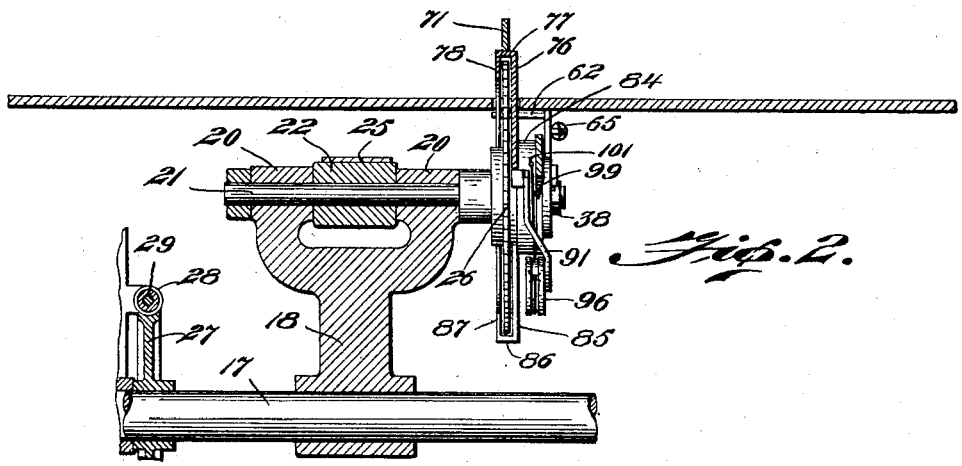
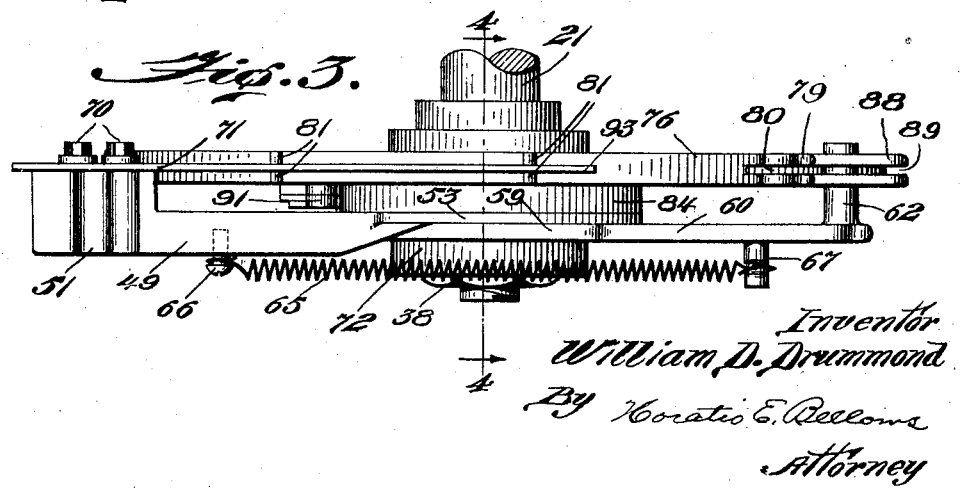

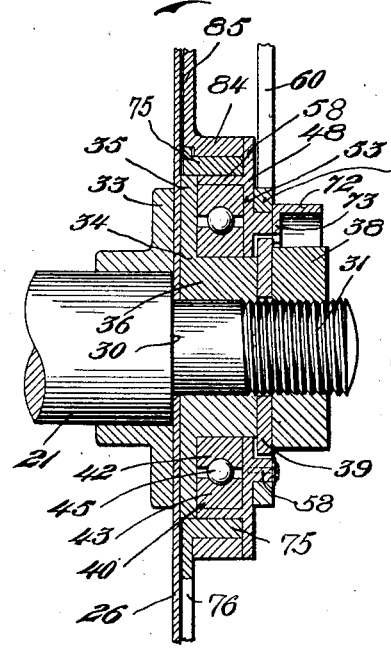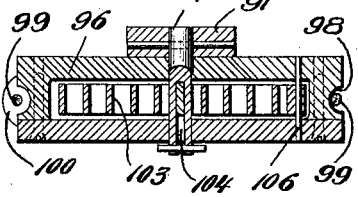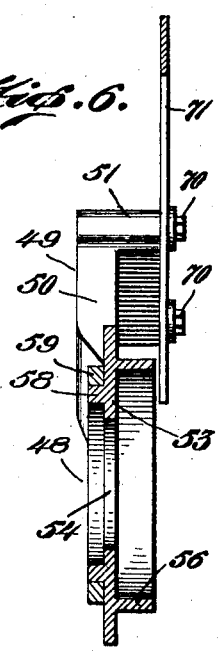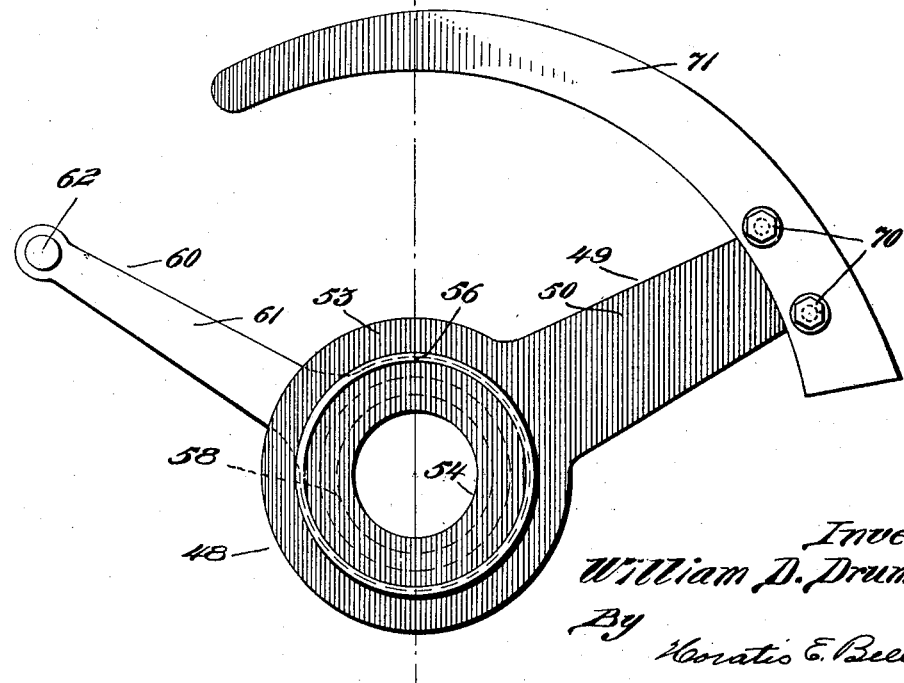

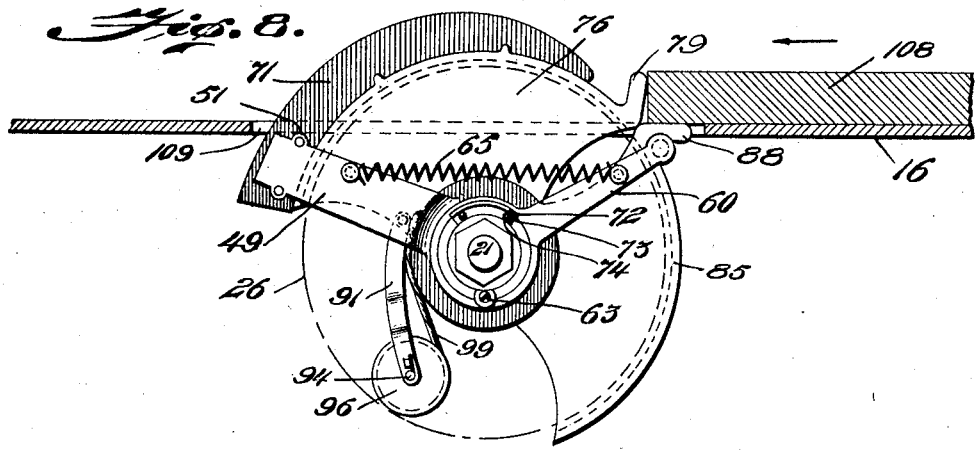
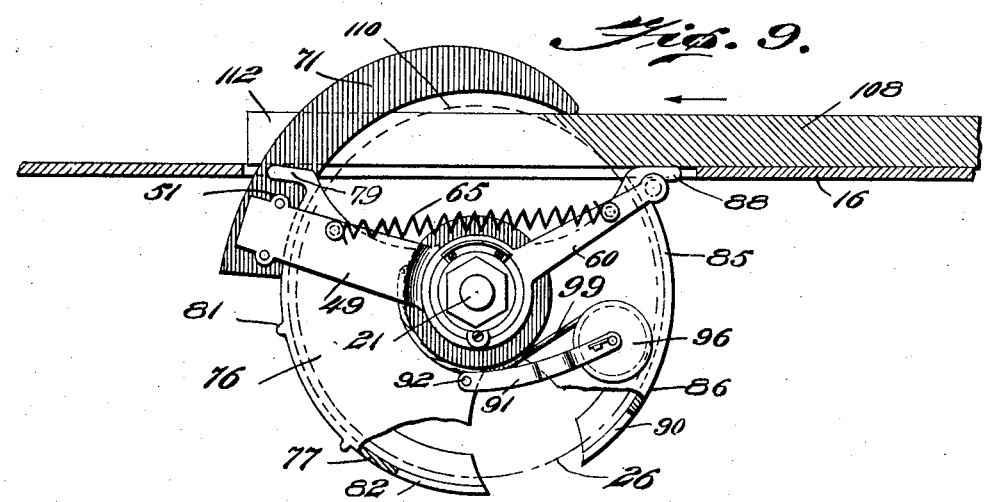
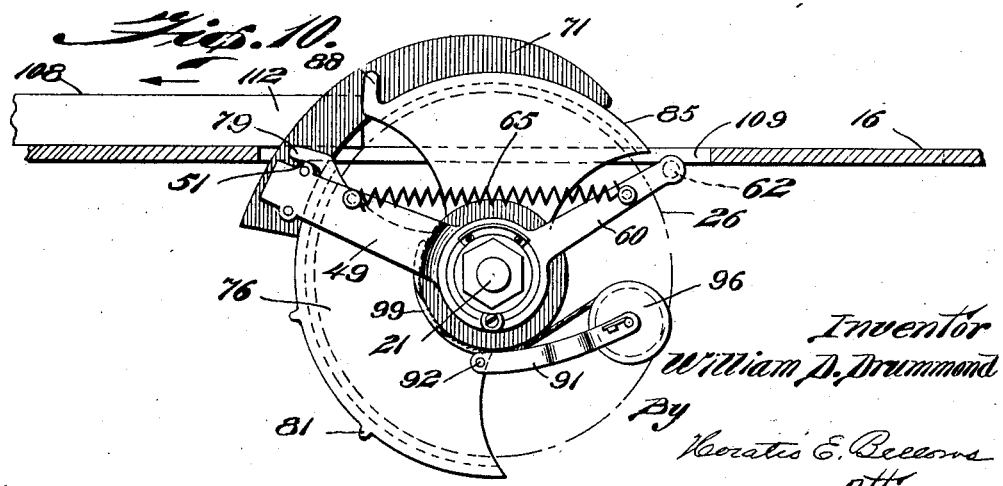

May 7, 1929.  W. D. DRUMMOND  1,711,490
SAW GUARD
Filed Sept. 12, 1927   4 Sheets-Sheet 4
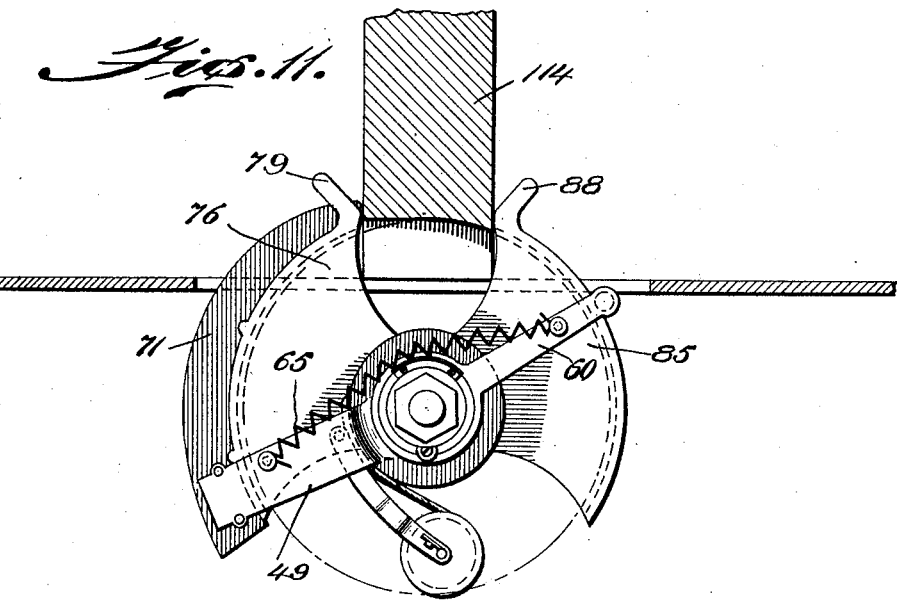
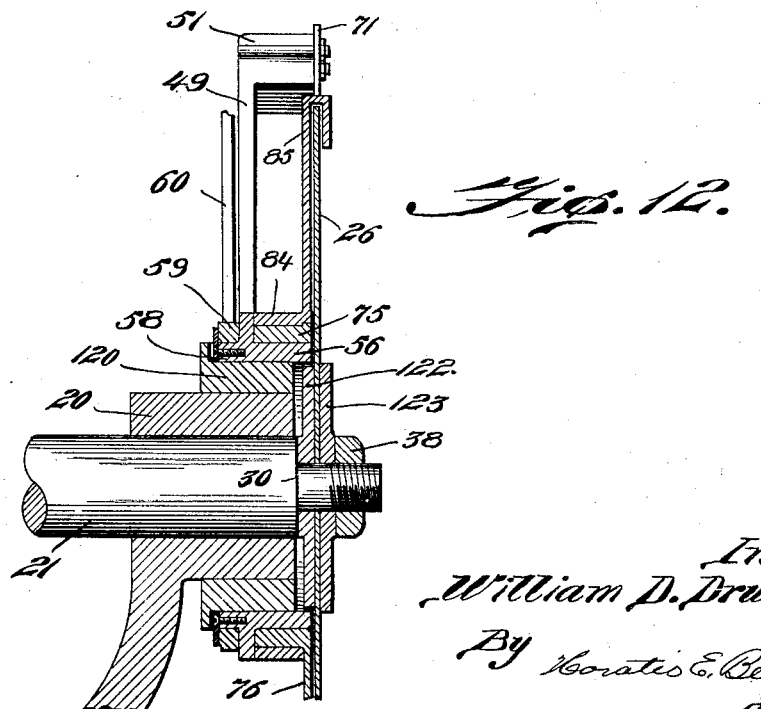
Inventor
William D. Drummond
By Horatio E. Bellows
Attorney Patented May 7, 1929.

1,711,490

UNITED STATES PATENT OFFICE.

WILLIAM D. DRUMMOND, OF CLIFFSIDE, NEW JERSEY.

SAW GUARD.

Application filed September 12, 1927. Serial No. 218,926.

My invention relates to that type of saw guards wherein one or more segments have pivotal or oscillatory movement relatively to the saw, a saw guard of which type is set forth in United States Letters Patent No. 1,464,924 issued to me August 14, 1923.

The essential objects of my invention are to completely protect the operator from injury from the saw teeth and from any kick back or accidental dislocation of the work during the sawing operation, and to attain these ends in a strong compact structure adapted for facile application to any saw.

My invention consists primarily in means cooperating with one or more guard wings or segments for preventing dislodgment or escape of the work from the saw; means auxiliary to such segment or segments for guarding the saw teeth; and improved means for tensioning the guard segments. My invention consists, further, in such features, combinations, and details of construction hereinafter described as fall within the scope of the claims hereto appended.

In the accompanying drawings which form a part of this specification and wherein like characters of reference indicate like parts throughout the views, Figure 1 is a side elevation of any usual or convenient saw frame showing my guard applied to the saw thereof, Figure 2, an incomplete fragmentary section of the same on line 2—2 of Figure 1, Figure 3, an enlarged plan view of my guard applied to the saw, Figure 4, a fragmentary section of the same taken on line 4—4 of Figure 3, Figure 5, a detail front elevation of the blade and its bearing arm detached from the remainder of the device, Figure 6, a section of the same taken on line 6—6 of Figure 5, Figure 7, a section of the spring housing member taken on line 7—7 of Figure 1, Figures 8, 9, and 10, side elevations of my guard in normal position; in its position during a portion of the sawing operation; and in its position near the close of the sawing operation, respectively, Figure 11, a fragmentary side elevation of my guard operating upon a vertically disposed piece of work, and Figure 12, a fragmentary section of a modified form of my invention.

In the construction of the saw frame shown the framework 15 includes a table 16. The former has journaled therein the rock shaft 17 whose actuating mechanism is omitted in this showing. Fast to the shaft is the spindle arm 18 having bearings 20 for the spindle or arbor 21 carrying the driving roll 22. The rolls 23 and 24 tension and guide the belt 25 which engages the roll 22 to rotate the saw 26 mounted on the arbor 21. 27 is the worm wheel, 28 the worm, and 29 the worm shaft of the spindle area adjustment. The application of my guard to the described structure is for illustrative purposes exclusively and not as a limitation of use. In this instance the outer end of the spindle is of reduced diameter forming a shoulder 30 and provided with a thread 31. The saw 26, which abuts against the shoulder 30, is clamped by inner and outer collars 33 and 34 respectively. The latter collar has a flanged portion 35 abutting against the saw, and a sleeve portion 36 which has a sliding fit upon the spindle. The collar is clamped against the saw by means of a nut 38, engaging the thread 31, and a washer 39. As herein shown a ball bearing 40 is provided comprising the usual inner and outer races 42 and 43 and balls 45. The race 42 is seated upon the collar 34. Rotatable upon the collar is the hub portion 48 of a pivoted arm 49 having a shank portion 50 and an offset end portion or lug 51. The hub portion of the arm 50, as shown in Figures 5 and 6, includes an annular disk portion 53 whose central opening 54 is for the reception of the sleeve portion 36 of the collar 34. Concentric with the opening 54 upon the inner face of the disk portion is a laterally projecting annular bearing 56 which embraces the outer ball race 43 and is a part of the hub portion of the arm 50. Upon the outer face of the disk portion, concentric with the opening 54, is a laterally projecting annular bearing 58 for the ring or hub portion 59 of a pivoted arm 60, having a shank 61 and a pin or offset portion 62. The bearing 58 is a part of the hub portion of the arm 50. The hub 59 is in this instance held against lateral movement upon its bearing 58 by means of one or more overlapping studs 63 fixed in the face of the bearing 58, as shown in Figure 1. The arms 49 and 60 are drawn towards each other by a helical spring 65 attached at its ends to pins 66 and 67 upon intermediate portions of the arms, and the arm 49 has attached to the end face of its offset 51 by screws 70 a flat curved tapering blade 71 with a rounded free end. An arcuate transversely angular guard plate 72 for the spring 65 has its base 73 attached by screws 74 to the face of the bearing 58.

A circularly movable hub 75 is mounted upon the bearing or hub portion 56 and has integral therewith a segmental plate 76 provided with a peripheral offset or lateral rim 77 terminating in an inwardly directed flange 78, as shown in Figure 2. The offset and flange combine to form a transversely U shaped housing which forms a housing for the saw. The rim 77 terminates in an upwardly directed rearwardly inclined lip 79 and is bifurcated by a slot 80, as shown in Figure 3, to allow passage therethrough of the blade 71 whose lower edge slides upon the rim. In this instance bifurcated shoulders 81 upon intermediate portions of the rim assist in guiding the blade. There is a slot 82 in one end of the rim, as shown in Figure 9.

Rotatably mounted on the hub 75 is a ring or hub 84 carrying an integral segmental plate 85 having a peripheral rim 86 and flange 87. Upon the end of the rim 86 is an angularly disposed upwardly directed lip 88 bifurcated, as shown in Figure 3, by a slot 89, in longitudinal alignment with the slot 80 to admit the blade 71. There is also a slot 90 in the opposite end of the rim 86, as shown in Figure 9. The flanges 79 and 87 combined with the rims and margins of their respective plates 76 and 85 serve to inclose the saw teeth on both sides of the roots of the latter. As shown the total peripheral measurement of the guard members is in excess of 180 degrees, hence the slots 82 and 90 are provided to admit the insertion of the saw. The slots are such that the diameter of the passage for the insertion of the saw is greater than the diameter of the latter. It will be understood that the saw is mounted in place before the device is applied to the saw arbor.

The two segmental guard members are yieldingly drawn towards each other by means of the following device. A depending curved arm 91 is attached to the lower inner margin of the plate 76 by a screw or pin 92, and has in its free end a pivot pin 94 upon which is rotatably mounted a drum of hollow wheel 96, as shown in Figure 7, provided with a peripheral groove 98 to receive a wire 99, one of whose ends is attached by a knot or otherwise to a perforated lug 100 upon the drum extending transversely of the groove. The other end of the wire is fixed by a pin 101 to the hub 84 of the plate 85, as shown in Figure 2. In the drum 96 is a flat coiled spring 103 surrounding the pin 94, having one end fixed in a slot 104 in the latter, and its other end fixed to a pin 106 transversely disposed in the drum.

The operation of my device may be understood from the illustrations of Figures 8 to 10 inclusive wherein a wooden block 108 is supposed to be moving in the direction of the arrow along the table 16 towards the saw 26 projecting through the table opening 109. The advance of the block, it will be noted, impels the plate 76 rearwardly, and simultaneously causes the plate 85 through the spring 103 to closely follow the block. In more detail, the member 76 is moved in the direction of the passage of the material or block being cut by the pressure of the block upon the lip 79 and is moved thereby until said lip is caused to descend below the upper face of the table 8, as shown in Figure 9, the member 85 being held down by the pressure of the block upon the lip 88, as shown in Figure 9. When the rear end of the block has passed lip 88 the guard member 85 follows the block, by the action of the spring 103, the member 85 following the end of the block, as shown in Figure 10, thus guarding the saw so that the teeth thereof are never exposed except sometimes when, as shown in Figure 9, the block is in an intermediate portion of its progress. At this moment a certain portion of the saw, as at 110, extends through the block. In this position however said saw portion is covered by the blade 71 which is in the plane of the saw and above the latter thus forming an auxiliary guard.

The blade carrying arm 49 has pivotal movement independently both of its pivoted anchor arm 60 and of the guard segments, and the latter arm is unaffected by the movements of the segments. The offset portion 62 of the arm 60 bears upwardly against the lower face of the table 16 continuously, and through the spring 65 tends to force the free end of the arm 49 or its offset portion 51 upwardly against the lower face of the table; but during at least a portion of the advance of the block 108 the end face of the latter contacts with the point of the blade, forcing the latter rearwardly, and in turn forcing its arm 49 downwardly against the tension of the anchor spring 65. The offset portion 62 of the arm 60 serves as a stop to control the downward movement of the lower guard member 85 by means of the contact therewith of the lip 38 of the guard, see Fig. 9, and thus the portion 62 is held in its uppermost position by the influence of the spring 65 and thus the member 85 is prevented from getting abnormally below the table. There is a natural tendency for the lower guard to rotate with and in the same direction as the saw and this rotation is prevented by the anchor arm 60. The degree and duration of depression is dependent largely upon the thickness of the block and the height of the saw. In Figures 9 and 11 the arm 49 is shown to be depressed to positions lower than in Figure 8. In Figure 10, wherein the contact of the blade point 93 upon the block is shown to have ceased, the arm 49 has, by means of the anchor arm 60 and its spring 65, been returned to its original elevated position.

During the advance of the block 108 across the saw, illustrated in Figures 8 to 10 inclusive, the shank of the blade 71 slides in the slot 112 closely following the saw throughout the length of the cut. This prevents accidental closing in or binding of the walls of the bifurcated block portions against the saw faces which occasions "kickbacks" of the block which often produce serious internal injuries to the operator. Accidental escape of the block is further prevented by the position of the blade point 93 upon the upper surface of the block in advance of the saw-slot, as shown in Figure 9. The blade automatically adjusts itself to various sizes and thicknesses of the stock or material being operated upon.

Under certain conditions, such as in sawing stock endwise, illustrated in Figure 11, wherein the blade 71 performs no function, the latter does not interfere with the progress of the stock 114, but is, because of its yielding character, pushed out of the way by the stock.

The mutually yielding circular movement of the arms 49 and 60 relatively to each other makes it possible to employ my guard upon a saw spindle regardless of the height at which the spindle is either fixed or adjusted relatively to the table 16.

My guard is self contained and may be easily applied or removed to or from the spindle by merely engaging or removing the nut 38.

The ball bearings may be omitted from my guard if preferred, and the guard may be mounted upon the spindle bearing 20 rather than upon the spindle itself. Such a construction is shown in Figure 12. Herein the hub portions 56 and 58 of the arm 49 are shown in horizontal alignment rather than offset from each other. In this instance said hub has pivotal movement on a bearing ring 120 upon a bearing 20, rather than on a saw clamping-collar 34. Herein also saw clamps 122 and 123 are substituted for clamps 33 and 34 respectively.

Although specific terms are herein employed, they are used in a generic and descriptive sense, and not for the purpose of limitation. The details of construction may be varied, and I do not purpose limiting the patent granted on this application otherwise than necessitated by the prior art.

I claim:—

1. In a saw guard, an inner and outer hub, two guard members rotatably mounted on the outer hub, both movable together in one direction and independently of each other in the opposite direction, an arm rigid with the outer hub, and a flat blade carried by the arm slidably engageable peripherally with the guard members.

2. In a saw guard, an inner and an outer hub, segmental guard members rotatably mounted upon the outer hub provided with laterally extending peripheral portions and movable together in one direction and independently of each other in the opposite direction, an arm upon the outer hub, and an arcuate blade carried by the arm movable over said peripheral portions.

3. In a saw guards, an inner and an outer hub, two guard members mounted on the outer hub and movable towards and from each other in the same vertical plane, resilient means connecting the guards, an arm on the outer hub, an arcuate blade carried by the arm slidable upon the guards, an anchor arm rotatably mounted upon the outer hub, and a spring connecting the arms.

4. In a saw guard, two independent guard members disposed edge to edge in the same vertical plane and axially connected, a pivoted arm axially connected at one end to the guard members, an arcuate blade supported upon the other end of the arm slidably engaging the guard members, and means independent of the guard members for yieldingly anchoring the arm.

5. In a circular saw guard, an inner and an outer hub, two segmental plates pivotally supported upon the outer hub, peripheral offset rims upon the plates, inwardly directed flanges upon the rims, a kerf splitting blade, lips upon the adjacent ends of the rims provided with aligned slots adapted to receive said blade.

6. In a circular saw guard, an inner and an outer hub, a segmental plate pivotally mounted on the outer hub, a peripheral offset rim upon the plate, guide shoulders upon the rim, a lip upon one end of the rim provided with a slot, a second segmental plate pivotally mounted upon the outer hub, a peripheral offset rim upon the second plate, a lip upon the second rim adjacent the first lip and provided with a slot, an arm on the outer hub and an arcuate blade carried by the arm slidable between the guide shoulders and in the slots of the lips and an anchor arm mounted on the hub and yieldingly connected with the said arcuate blade and stop means on said segmental plate.

7. In a circular saw guard, an inner and an outer hub, two guard members rotatably mounted upon the outer hub and movable towards and away from each other in the same vertical plane, an arm upon one guard member, a flexible member upon the other guard member, and resilient means carried by the arm for tensioning the flexible member.

8. In a circular saw guard, an inner and an outer hub, two guard members rotatably mounted upon the outer hub and movable towards and away from each other, an arm upon one guard member, a pivot pin in the arm, a hollow drum rotatably mounted upon the pivot pin, a flexible member attached to the drum and to the second guard member, and a coil spring in the drum surrounding the pin and attached at one end to said pin, and attached at its other end to the drum.

9. A saw and its support, a guard for the saw comprising segmental guard members mounted upon the support and provided with laterally directed peripheral portions extending over the saw, and a slidable blade yieldingly supported over and in engagement with said peripheral portions in the path of the work.

In testimony whereof I have affixed my signature.

WILLIAM D. DRUMMOND.